US007681074B2

(12) United States Patent
Warman et al.

(10) Patent No.: US 7,681,074 B2
(45) Date of Patent: Mar. 16, 2010

(54) TRANSPORT HIGH AVAILABILITY

(75) Inventors: Leon Warman, Kirkland, WA (US); Eric D. Tribble, Bellevue, WA (US); Malcolm Pearson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1202 days.

(21) Appl. No.: 11/118,870

(22) Filed: Apr. 29, 2005

(65) Prior Publication Data
US 2006/0248373 A1 Nov. 2, 2006

(51) Int. Cl.
*G06F 11/00* (2006.01)
(52) U.S. Cl. ............................................. 714/13; 714/4
(58) Field of Classification Search .................. None
See application file for complete search history.

(56) References Cited

U.S. PATENT DOCUMENTS

| 5,909,564 | A | 6/1999 | Alexander et al. | |
|---|---|---|---|---|
| 5,958,005 | A | 9/1999 | Thorne et al. | |
| 6,249,807 | B1 | 6/2001 | Shaw et al. | |
| 6,336,135 | B1 | 1/2002 | Niblett et al. | |
| 6,487,586 | B2 | 11/2002 | Ogilvie et al. | |
| 6,647,474 | B2 * | 11/2003 | Yanai et al. | 711/162 |
| 6,684,306 | B1 * | 1/2004 | Nagasawa et al. | 711/162 |
| 6,745,303 | B2 * | 6/2004 | Watanabe | 711/161 |
| 6,757,763 | B1 | 6/2004 | Preiss et al. | |
| 6,823,349 | B1 * | 11/2004 | Taylor et al. | 707/204 |
| 7,165,082 | B1 * | 1/2007 | DeVos | 707/203 |
| 7,181,017 | B1 | 2/2007 | Nagel et al. | |
| 7,356,578 | B1 | 4/2008 | Eatough | |
| 7,603,423 | B2 * | 10/2009 | Ito et al. | 709/206 |
| 2001/0032245 | A1 * | 10/2001 | Fodor | 709/206 |
| 2002/0097687 | A1 | 7/2002 | Meiri et al. | |
| 2002/0162047 | A1 | 10/2002 | Peters et al. | |
| 2003/0154254 | A1 | 8/2003 | Awasthi | |
| 2003/0177194 | A1 | 9/2003 | Crocker et al. | |
| 2003/0200480 | A1 * | 10/2003 | Beattie | 714/13 |
| 2004/0157598 | A1 | 8/2004 | Parkman | |
| 2004/0158766 | A1 * | 8/2004 | Liccione et al. | 714/4 |
| 2004/0167965 | A1 | 8/2004 | Addante et al. | |
| 2005/0160248 | A1 * | 7/2005 | Yamagami | 711/170 |
| 2005/0256931 | A1 | 11/2005 | Follmeg et al. | |
| 2005/0262205 | A1 | 11/2005 | Nikolov et al. | |
| 2005/0281191 | A1 | 12/2005 | McGee et al. | |

(Continued)

FOREIGN PATENT DOCUMENTS

JP 2001-326691 A 11/2001

(Continued)

OTHER PUBLICATIONS

Myers et al., "RFC1939—Post Office Protocol—Version 3", May 1996, Network Working Group.*

(Continued)

*Primary Examiner*—Gabriel L Chu
(74) *Attorney, Agent, or Firm*—Senniger Powers LLP

(57) ABSTRACT

Failover systems and methods for providing redundant backup of data transmitted over a network to provide transport high availability of electronic data. The present invention relates to creating redundant backup copies of electronic data as well as transmission of the backup copies over a network in the event of a failure of a network component.

16 Claims, 7 Drawing Sheets

U.S. PATENT DOCUMENTS

| | | | |
|---|---|---|---|
| 2005/0283655 A1* | 12/2005 | Ashmore ........................ | 714/7 |
| 2005/0283658 A1* | 12/2005 | Clark et al. ................... | 714/11 |
| 2006/0203718 A1* | 9/2006 | Benhase et al. ............. | 370/220 |
| 2006/0218210 A1* | 9/2006 | Sarma et al. ................ | 707/204 |
| 2006/0253597 A1 | 11/2006 | Mujica | |

FOREIGN PATENT DOCUMENTS

| | | |
|---|---|---|
| KR | 1020010092554 A | 10/2001 |
| KR | 1020040079667 A | 9/2004 |
| KR | 1020040091656 A | 10/2004 |

OTHER PUBLICATIONS

BorderWare's MXtreme and F5's BIG-IP system Provide High Availability, Security and Scalability for Enterprise Email Systems (http://www.f5.com/solutions/applications/email/borderware_mxtreme_sb.html).

Planning an Exchange Server 2003 Messaging System (http://www.microsoft.com/technet/prodtechnol/exchange/guides/PlanE2k3MsgSys/a3a16698-3caa-4c84-bdc4-0526059ab0b6.mspx).

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

* cited by examiner

SMTP Geo - Cluster

TRANSPORT HIGH AVAILABILITY

TECHNICAL FIELD

Embodiments of the present invention relate to the field of transport high availability of electronic data. In particular, embodiments of this invention relate to creating redundant backup copies of electronic data, as the electronic data is received, to provide a failover mechanism for transport of electronic mail.

BACKGROUND OF THE INVENTION

Transport relates to both the quality of service and accurate delivery of electronic data. Specifically, transport involves the accurate delivery of data from a source to a target location. High availability relates to a computer system or component thereof that remains operational in spite of a component failure in the system. Thus, the present invention relating to transport high availability generally refers to systems and methods that maintain the accurate delivery of electronic data over a computer network in the event of a failure of a component within the network.

Some prior systems periodically back up electronic data on a regular or "snapshot" basis, such as a nightly backup of electronic data stored on a system. Such systems capture the electronic data that are located on a server at a particular time, for example, at the end of a business day. However, while these systems and methods may backup electronic data that remains at a specific location, such as text documents or database files specific to a local company site, such prior systems and methods fail to capture electronic data that only temporarily resides on a server as it is transmitted from a source location to a target location on a network. An example of such data includes email messages or other electronic data that pass through several servers on a network as the data is sent or transmitted from a source server to a target server. Since transmitted data may be stored at a particular server for only a fraction of a day before being forwarded to another server and deleted, a nightly download would not adequately backup the electronic data in the event a component fails in the network.

Accordingly, a system for transport high availability is desired to address one or more of these and other disadvantages.

SUMMARY OF THE INVENTION

The present invention overcomes the deficiencies of the known art by providing a transport high availability system and method wherein transmitted electronic data is received by a first device and redundantly backed up to a second device prior to the first device confirming receipt of the data. Thus, if the first device fails prior to sending the data to a subsequent device, the data can be recovered and forwarded to the subsequent device on the data's path to a target without loss of data.

In accordance with the present invention, one aspect provides a computer-implemented method for redundantly saving electronic data transported over a computer network. The method includes receiving the data at a location from a source. The data received from the source is saved to a primary computing device. Primary backup data corresponding to the saved data is saved to a secondary computing device remote from the location. The method also includes confirming when the primary backup data is saved to the secondary computing device and confirming to the source that the data has been received.

Another aspect of the present invention includes a system for providing recovery of electronic data transported over a computer network wherein the network connects a source server and a target server. The system comprises a primary server for receiving data from a source server and storing the received data in a primary server memory area and a secondary server remote from the primary server. The primary server is configured to execute computer-executable instructions for receiving data from the source server; saving data to the primary server memory area; and sending primary backup data corresponding to data received from the source server to the secondary server. The secondary server is configured to execute computer-executable instructions for receiving primary backup data; saving primary backup data to a secondary server memory area; and providing confirmation to the primary server when the primary backup data has been saved.

Another aspect of the present invention includes computer-readable media having computer-executable components for providing high availability transport of electronic data. The components comprise a primary component receiving data from a source and storing the received data in primary storage; a storage component saving data to a remote computer device and confirming it has been saved; and a source component confirming to the source that the data has been received.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
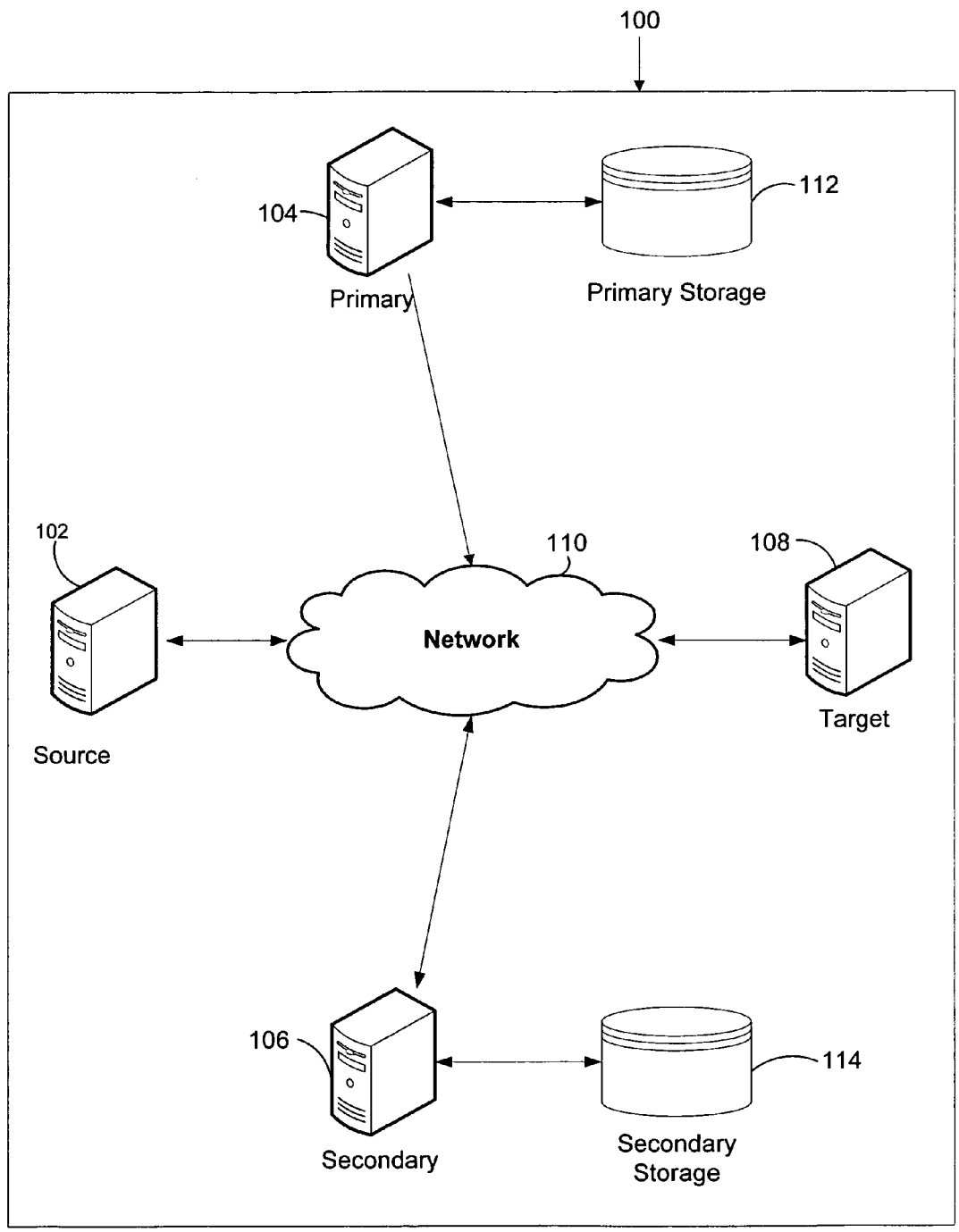
FIG. 1 is a block diagram illustrating an exemplary embodiment of a suitable system of the present invention.

Referring first to FIG. 1, a block diagram illustrates an exemplary embodiment of a system in which one embodiment of the present invention may be implemented. A system 100 has source 102, primary 104, secondary 106, and target 108, all having access to network 110. Primary 104 has access to primary storage 112 and secondary 106 has access to secondary storage 114 in which data may be stored. Secondary 106 and secondary storage 114 may be remotely located from primary 104 and primary storage 112.

Source 102 transmits data via network 110 for ultimate receipt by target 108. Primary 104 is an intermediate data transfer device within the pathway of network 110 through which data is transferred as it is sent from source 102 to target 108. Primary 104 receives data from source 102 via network 110. Primary 104 stores data in primary storage 112 and sends a copy of the data to secondary 106 for backup storage in the event that a failure of primary 104 should occur. Secondary 106 saves a backup copy of the data to secondary storage 114. Secondary 106 confirms to primary 104 when a backup copy of the data has been saved. As used herein, a confirmation action relates to a receiving device that sends a confirmation to a sending device that an action has been taken by the receiving device. Once confirmation has been made that a backup copy of data exists, primary 104 provides confirmation to source 102 that it has received the data. Primary 104 then transfers the data, via network 110 to the next data transfer device in the pathway to target 108 or, alternatively, directly to target 108.

In one embodiment, primary 104 sends the data directly to target 108. Target 108, upon successfully receiving the data, provides confirmation to primary 104 that the data has been received. Upon being notified that the data has been successfully transferred and received by target 108, primary 104 deletes the copy of the data saved on primary storage 112. Primary 104 notifies secondary 106 that target 108 confirmed the receipt of the data. Upon receiving notification of the confirmation by target 108, secondary 106 deletes the backup copy of the data saved on secondary storage 114.

In one embodiment, primary 104 sends the data directly to target 108. Target 108, upon successfully receiving the data, provides confirmation to primary 104 that the data has been received. Upon being notified that the data has been successfully transferred and received by target 108, primary 104 notifies secondary 106 that target 108 confirmed the receipt of the data. Upon receiving notification of the confirmation by target 108, secondary 106 deletes the backup copy of the data saved on secondary storage 114. Primary 104 then deletes the copy of the data saved on primary storage 112. An advantage of primary 104 instructing secondary 106 to delete its backup copy first is manifested during a failure wherein primary 104 fails to tell secondary 106 to delete the backup copy of the data saved on secondary storage 114.

In another embodiment, primary 104 transfers the data to the next transfer device in the pathway to target 108. Upon receipt of the data, the next data transfer device, similar to the process described above, would save a copy to its local storage and send a backup copy to a remote device for saving a backup copy of the data. Once the next data transfer device receives confirmation that a backup copy has been saved, it provides confirmation to primary 104 that the data has been received. Primary 104, having received confirmation that the data has been successfully transferred and received by the next transfer device, deletes the copy of the data saved on primary storage 112. Primary 104 notifies secondary 106 that the next transfer device has confirmed receipt of the data. Upon receiving notification of the confirmation by the next transfer device, secondary 106 deletes the backup copy of the data saved on secondary storage 114. This process is continued until the data is ultimately received by target 108.

In one embodiment, only some nodes connected to network 110 have redundancy.

In another embodiment, a single message is relayed to multiple destinations and thereby follows a tree of delivery rather than a path.

Figure 2:
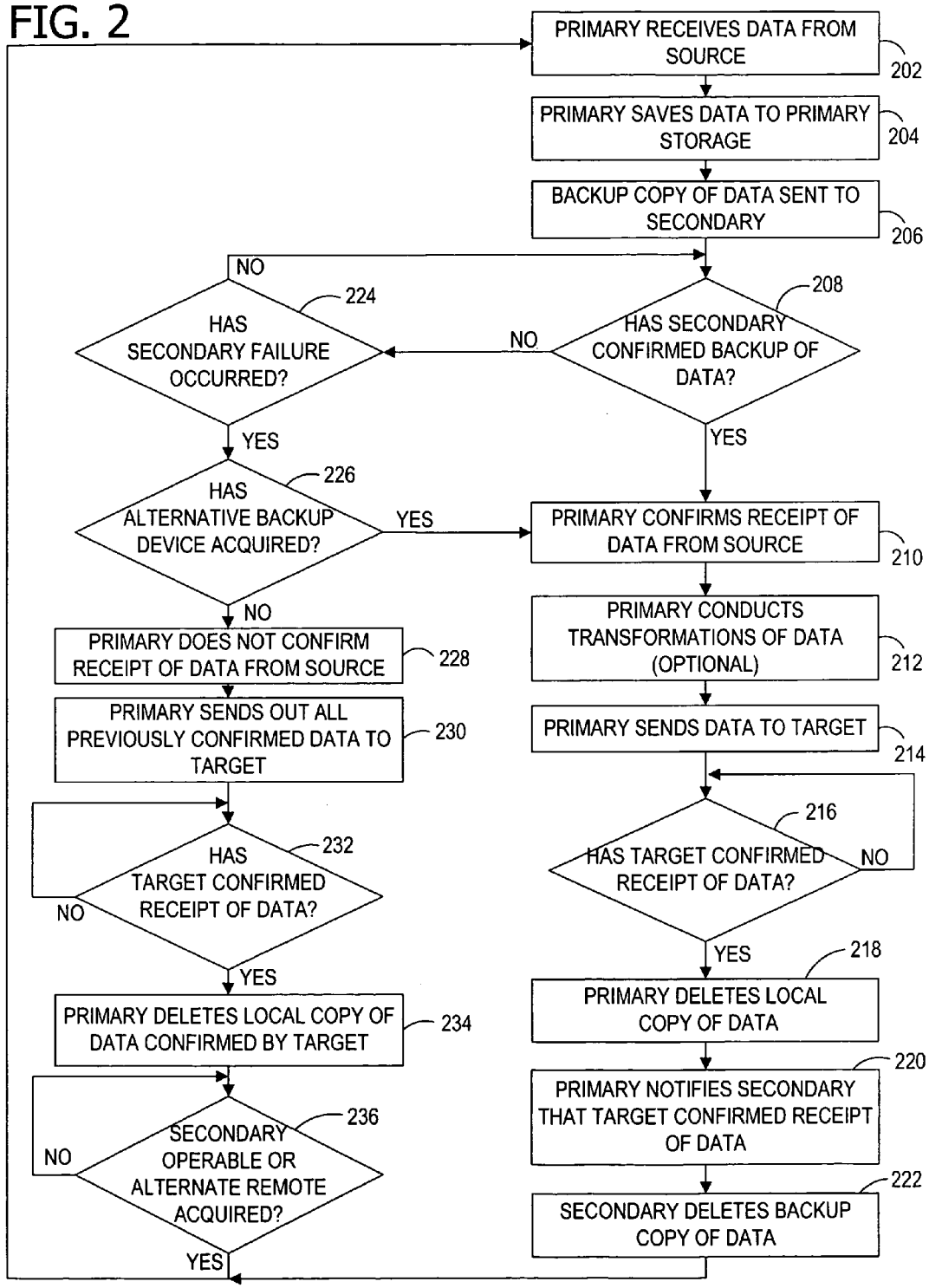
FIG. 2 is a flowchart illustrating an exemplary process of one embodiment of the present invention wherein electronic data being conveyed over a network is redundantly saved prior to confirmation of receipt by a device and subsequent transmission to a successive device.

FIG. 2 provides a flowchart illustrating an exemplary process of one embodiment of the present invention wherein electronic data being conveyed over a network is redundantly saved prior to its receipt being confirmed. Primary 104 receives electronic data from source 102 at 202. Non-limiting examples of primary 104 include computing devices, servers, components, Mail Transfer Agents handling Email via SMTP, X.400, fax systems, notification systems, and the like. Non-limiting examples of source 102 include an initiating computing device, server, component, Mail Transfer Agent handling Email via SMTP, X.400, fax system, notification system, and the like that initially transmitted the data, or, alternatively, a computing device, server, component, Mail Transfer Agent handling Email via SMTP, X.400, fax system, notification system, and the like that is immediately upstream from primary 104 in the pathway along network 110 from source 102 to target 108. "Source 102" is hereinafter used to describe a computing device, server, component and the like that either initiates data or is immediately upstream from primary 104. Primary 104 saves the received data to primary storage 112 at 204 and sends a copy of the received data to secondary 106 for remotely saving a backup copy of the data at 206.

At 208, primary 104 determines whether secondary 106 has saved a backup copy of the data. If primary 104 does not receive confirmation that secondary 106 has saved a backup copy of the data, primary 104 proceeds to 224 to determine whether secondary 106 has failed. If primary 104 determines that secondary 106 has not failed, primary 104 again determines if secondary 106 has saved a backup of data at 208.

If primary 104 receives confirmation that a backup of data has been saved by secondary 106 at 208, primary 104 provides confirmation at 210 to source 102 that the data has been received. Primary 104 may optionally perform transformations on the data at 212. Primary 104 may or may not relay these changes to secondary 106. Non-limiting examples of optional transformations include expanding distribution lists, adding Alternate recipients, adding disclaimers, removing viruses, substituting addresses, and the like. At 214, primary 104 sends the data to target 108. Non-limiting examples of target 108 include an computing device, server, component, and the like that is the intended recipient of the transmitted data, or, alternatively, a computing device, server, component, and the like that is immediately downstream from primary 104 in the pathway along a computer network 110 from the initiating source 102 to target recipient 108 (hereinafter collectively referred to as "target 108").

At 216, primary 104 determines whether target 108 has confirmed receipt of the data. If target 108 has not confirmed receipt of the data, primary 104 again repeats the determination at 216 until target 108 has confirmed receipt of the data.

When target 108 has confirmed the receipt of the data to primary 104 at 216, primary 104 deletes the locally-stored copy of the data on primary storage 112 at 218. At 220, primary 104 provides to secondary 106 confirmation that target 108 received the data. Secondary 106 then deletes the backup copy of the data at 222 and the process of FIG. 2 can be repeated.

If primary 104 determines that a failure of secondary 106 has occurred at 224, primary 104 determines if an alternative backup device is acquired at 226 to remotely save primary backup data. If an alternative backup device is acquired, primary 104 confirms receipt of the data from source 102 at 210.

If an alternative backup device is not acquired, primary 104 does not confirm receipt of data from source 102 at 228 and sends out all the data that it previously confirmed to target 108 at 230.

At 232, primary 104 determines whether target 108 has confirmed receipt of the data. If target 108 has not confirmed receipt of the data, primary 104 again determines whether target 108 has confirmed receipt of the data at 232. When primary 104 determines that target 108 has confirmed data, primary 104 deletes the locally-stored copy of the data at 234.

At 236, primary 104 determines if the failure of secondary 106 has been repaired such that secondary 106 is operable again. Alternatively, primary 104 determines if an alternative backup device has been acquired to save backup data at a location remote from primary 104. If primary 104 determines either that secondary 106 is not operable, that the operability of 106 cannot be determined, or that an alternative backup device has not been acquired, primary 104 repeats its determination at 236. Once primary 104 determines that secondary 106 is operable again or that an alternative backup device has been acquired at 236, primary 104 can receive data from source at 202, confirm its receipt, and repeat the process of FIG. 2.

Figure 3:
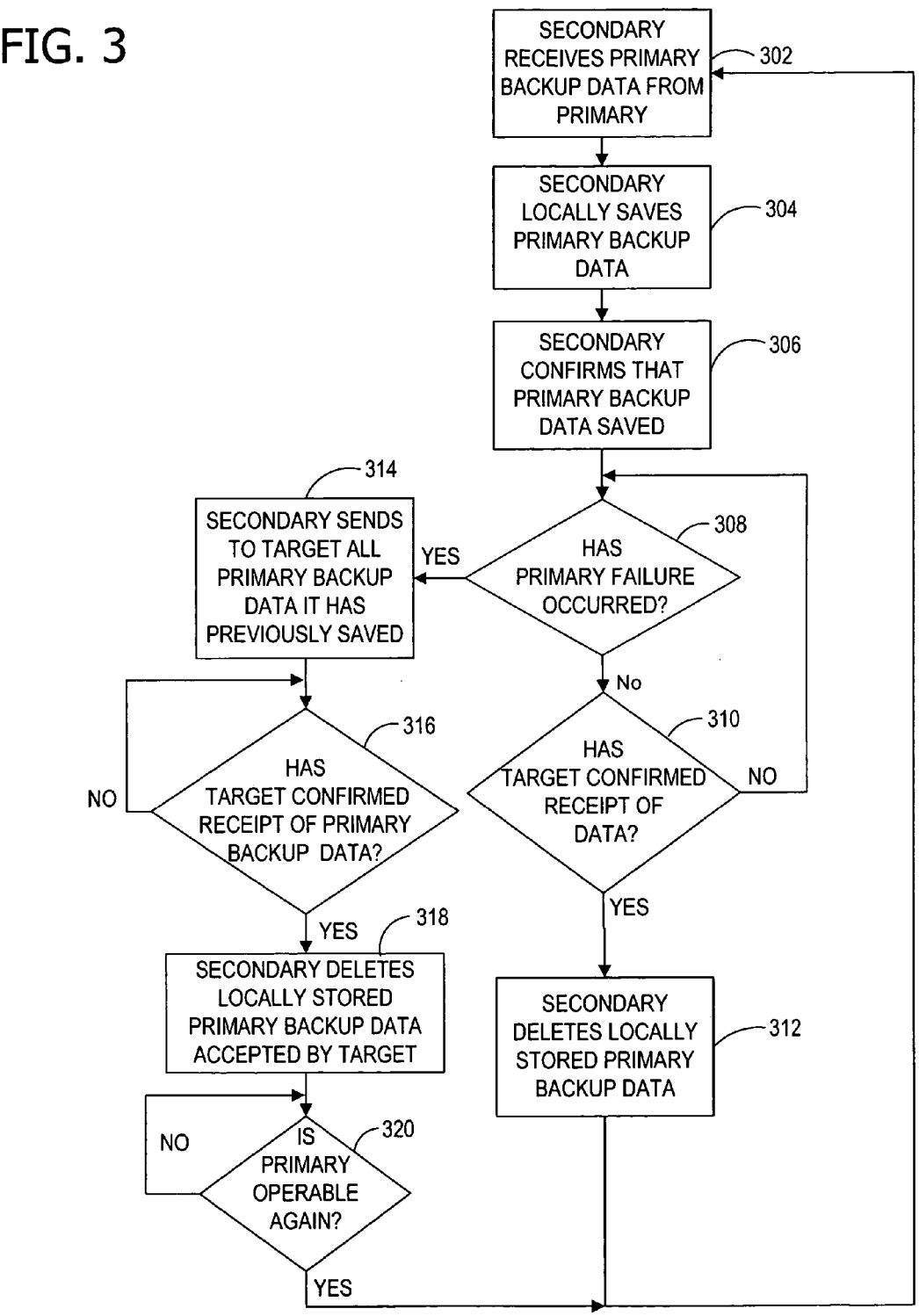
FIG. 3 is a flowchart illustrating an exemplary failover process of one embodiment of the present invention wherein a primary component failure occurs during the transmission of electronic data over a network.

FIG. 3 provides a flowchart illustrating an exemplary failover process of one embodiment of the present invention wherein a component failure occurs during the transmission of electronic data over a network. The process illustrated in FIG. 3. is from the perspective of secondary 106 when a failure of primary 104 is determined. At 302, secondary 106 receives backup data (hereinafter referred to as "primary backup data") from primary 104. Secondary 106 locally saves primary backup data on secondary storage 114 at 304. Secondary 106 provides confirmation to primary 104 that primary backup data has been saved at 306.

Secondary 106 determines whether primary 104 has failed at 308. If primary 104 has not failed, secondary 106 determines whether primary 104 has received confirmation that data has been received by target 108 at 310. If target 108 has confirmed receipt of the data, secondary 106 deletes locally-stored primary backup data at 312 and the process of FIG. 3 is repeated at 302. If primary 104 has not received confirmation that target 108 has received the data, secondary 106 again determines whether primary has failed at 308.

If secondary 106 determines at 308 that a failure of primary 104 has occurred, at 314 secondary 106 sends target 108 all saved primary backup data. At 316, secondary 106 determines whether target 108 has confirmed receipt of the primary backup data. If secondary 106 determines that target 108 has not confirmed receipt of the primary backup data, secondary 106 again repeats its determination at 316.

If secondary 106 determines that target 108 has confirmed the receipt of the primary backup data at 316, secondary 106 deletes the locally-stored primary backup data that has been confirmed by target 108 at 318.

Secondary 106 determines if primary 104 is operable at 320. If primary 104 is not operable, secondary 106 repeats its determination at 320. If primary 104 is determined to be operable, the process of FIG. 3 is repeated at 302.

The systems and methods of the present invention provide for transport high availability of electronic data that is transmitted over a network. In one embodiment, secondary 106 is remotely located from primary 104 such that an event that may result in a failure of primary 104 is unlikely to also cause the failure of secondary 106. For example, primary 104 and secondary 106 may be located in different buildings, different cities, different countries, or different continents. Alternatively, primary 104 and secondary 106 may be located on separate power grids, have separate backup power supplies, be connected to different clusters in a computer network, and the like.

A failure of a component may be determined through automated or manual methods. Some non-limiting examples of automated methods include one component polling a second component, one component determining the failure of a second component when transmitted notifications fail to be received, voting mechanisms among multiple devices to determine network partition versus machine failure, and the like. Human intervention may also identify the failure of a component such as when a communication links have been disrupted, a server is known to be broken or in the process of beginning repaired, and the like.

While FIGS. 1-3 disclose a primary 104 and a secondary 106, the present invention includes additional designs of primary and secondary components. In one embodiment, the design of primary and secondary components form a ring wherein primary device sends primary data received from a source as primary backup data to secondary for remotely saving a backup copy of the primary data. Secondary, in turn, sends secondary data it receives from a source as secondary backup data to tertiary for remotely saving a backup copy of the secondary data. Tertiary, in turn, sends tertiary data it receives from a source as tertiary backup data to primary for remotely saving a backup copy of the tertiary data. Thus, in this embodiment, three devices are in a ring formation wherein they each locally save data received from a source and send a backup copy to a remote component to be saved remotely. This design can be altered to include additional devices in the ring. An illustration of one embodiment of this design is presented in FIG. 5. In this illustration, the secondary databases are depicted as being located in the node to the right on the ring. In one aspect of the present invention, bridgeheads are arranged in a ring with a single secondary database in each bridgehead.

In one embodiment, upon failure of a server or node, an SQL query can be performed to move the work from the secondary database to other existing bridgehead databases, either primary or secondary. This operation may require manual intervention. Alternatively, the operation may also occur automatically upon failure of a server or node. The bridgehead databases receiving the transferred backup data can then transmit the data to the appropriate target server or node.

Figure 5:
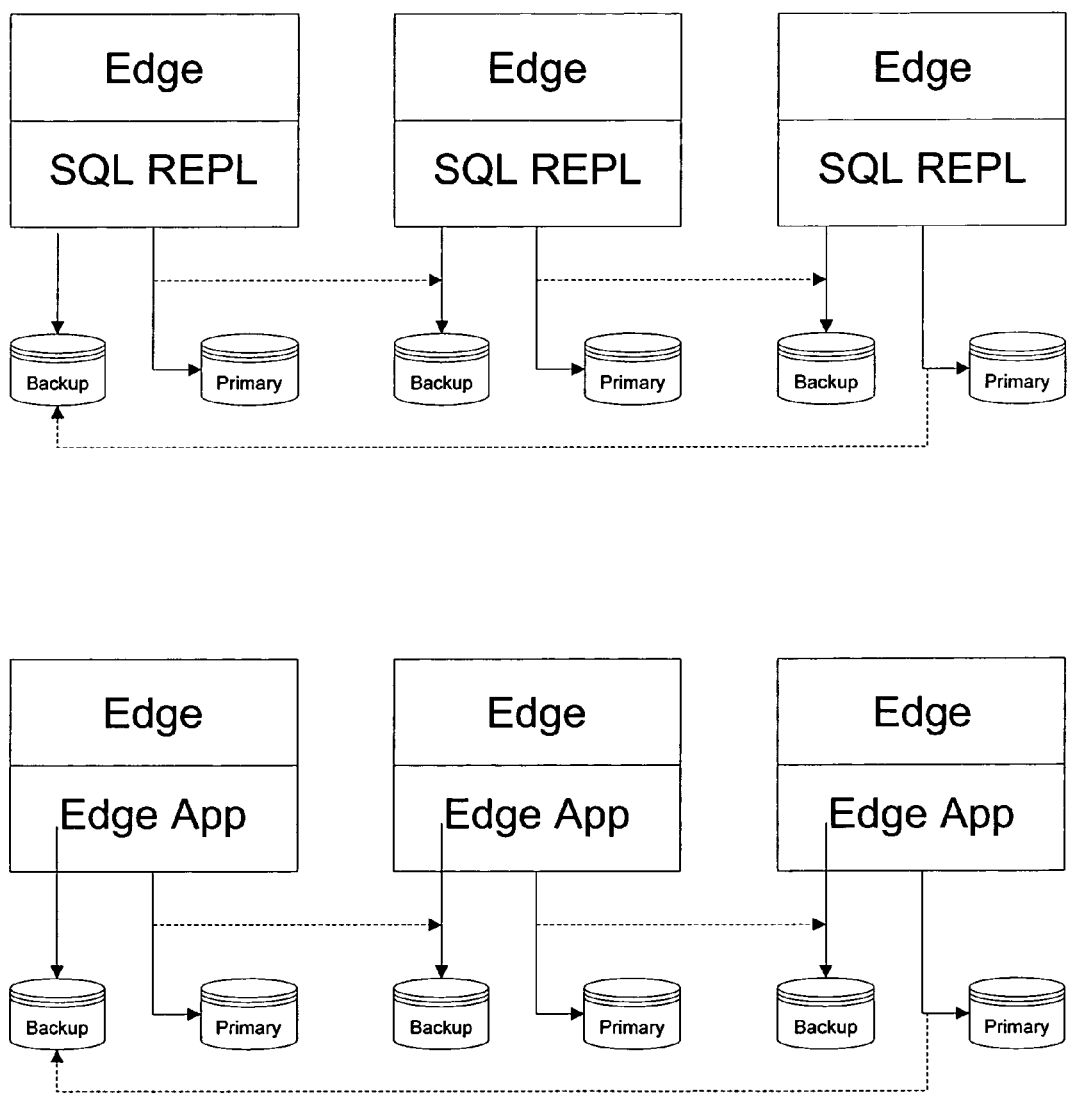
FIG. 5 is a block diagram illustrating two examples of methods of backing up data using either SQL replication or and Edge application.

In one embodiment, the present invention is used as a failover design using SQL replication. In another embodiment, the present invention is used as a failover design using an Edge Application (Microsoft Corp., Redmond, Wash.). Examples of these embodiments are illustrated in FIG. 5. SQL replicates all changes; Edge application can optimize and batch changes to reduce latency or network load. The difference is the storage mechanism. Additionally, there are many options that may be utilized, including other file systems, other databases, log based file systems, and so forth.

Figure 6:
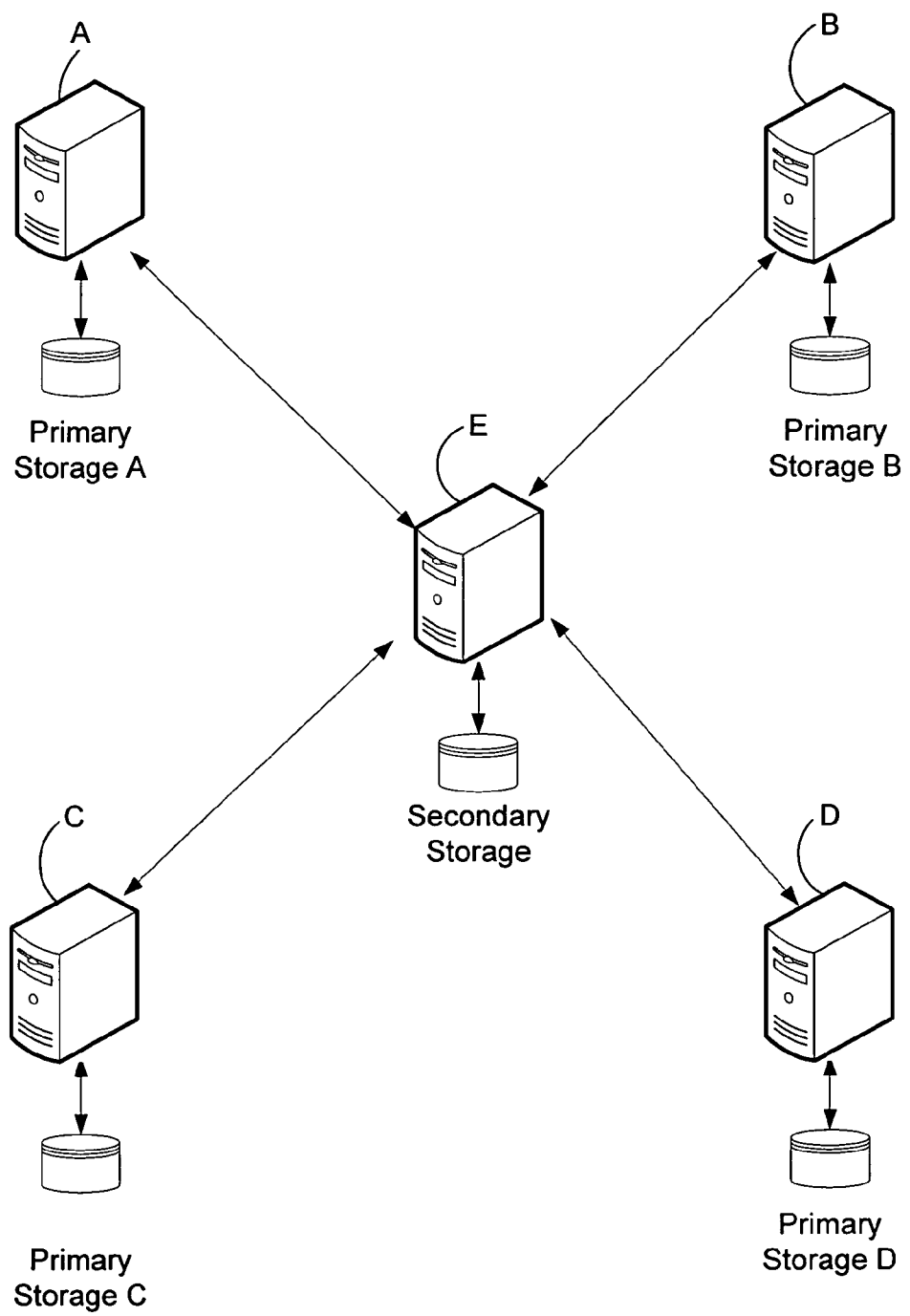
FIG. 6 is a block diagram illustrating one example of a failover design having a star design wherein one secondary device serves as a backup storage device for a plurality of primary devices.

In another embodiment, the failover design is in the form of a star, rather than a ring. An illustration of this design is presented in FIG. 6 illustrating one example of a failover design having a star design wherein one secondary device serves as a backup storage device for a plurality of primary devices. In this embodiment, Server A, Server B, Server C, and Server D, which function as primary servers, are arranged such that they each have access to Server E, a secondary server. Server E is utilized to which remotely backup data received by Server A, Server B, Server C, and Server D.

Figure 7:
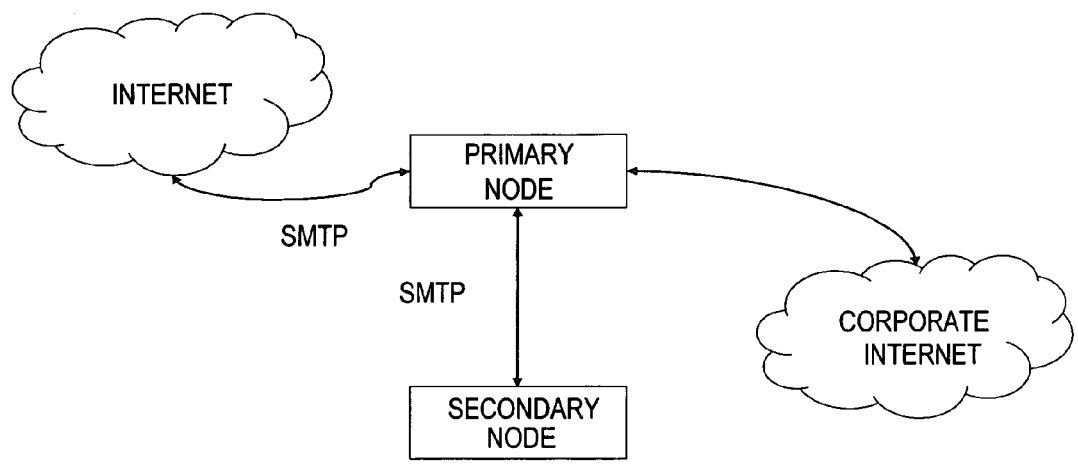
FIG. 7 is a block diagram illustrating one example of a SMTP Geo-Cluster arrangement.

In another embodiment, storage area network (SAN) based storage of data is used wherein the hard disk storage for backup data is remotely located. San devices can be attached to a machine virtually and so reduce manual intervention to move storage from one compute node to another. SAN devices allow resources to be shared more effective among compute devices The present invention is not limited to a single transfer protocol. A non-limiting list of protocols which may be used to transfer data through a network and between source 102, primary 104, secondary 106, and target 108 include SMTP, TSQL, CIFS, HTTP, and FTP, x400, fax among others. Data transfer may also be transmitted over the internet via TCP, wirelessly sent to another device or server, or document processing system, office automation system, order processing system, and the like. An illustration of a block diagram illustrating one example of a SMTP Geo-Cluster arrangement is provided in FIG. 7. In this design, a primary node has access to the internet, a corporate intranet, and a secondary node. In such a design, a primary node can receive and send data between the internet an a corporate intranet while maintaining transport high availability.

The present invention may be used as a method for transport high availability in a single cluster of devices or servers located in a building. Alternatively, the present invention may be used as a method for transport high availability in two or more clusters of devices or servers located in a single geographic location such as a building, corporate campus, or city. In another embodiment, the present invention may be used on a network, such as a corporate network or university network that includes devices or servers in multiple states, countries, or continents. In yet another embodiment, devices or servers may be connected through the internet.

Figure 4:
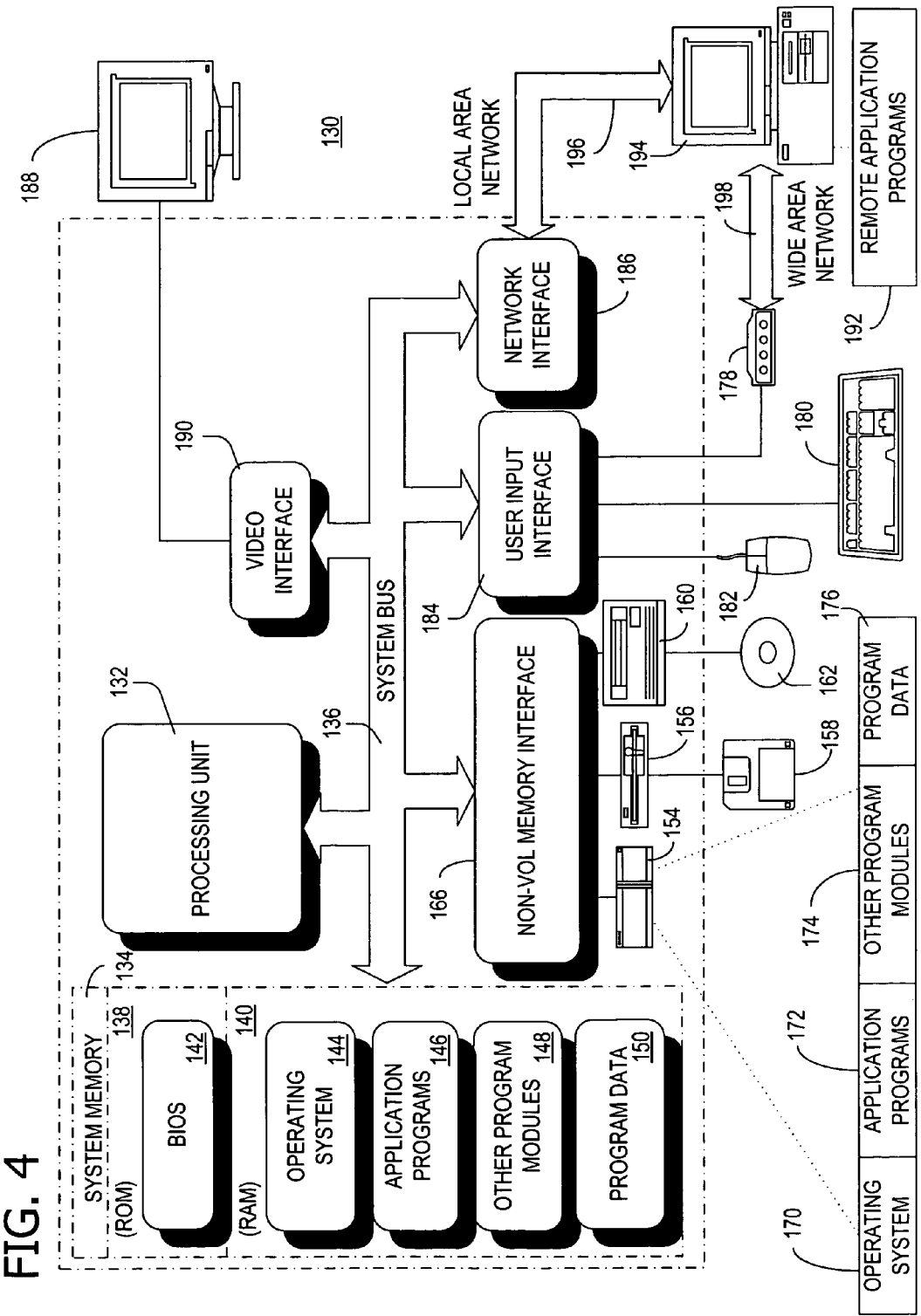
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB).

A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIS) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The following example further illustrates the invention.

EXAMPLE

High Availability and Resynchronization After Server Failure

Server A, B, and C are located remotely from each other on a network and form a ring of backup servers to each other. Server A receives data from Source A that is being sent to Target A. Server A sends data received from Source A to Server B for remote backup storage (A backup data). Server B receives data from Source B that is being sent to Target B. Server B sends data received from Source B to Server C for remote backup storage (B backup data). Server C receives data from Source C that is being sent to Target C. Server C sends data received from Source C to Server A for remote backup storage (C backup data).

Failure of Server B

Server B fails. Server A, which sends A backup data to Server B, determines that Server B has failed. Server A immediately ceases confirming receipt of additional data from Source A. Server A then begins sending the data received from Source A, which it has confirmed receipt and saved locally, to Target A. Server A does not confirm the receipt of additional data sent by Source A until either it determines that Server B is again able to receive and store A backup data or Source A acquires another server to provide remote storage of A backup data.

Server C, which receives B backup data from Server B, determines that Server B has failed. Server C immediately begins sending to Target B all the B backup data that is saved in Server C's storage. Server C queues of B backup data are continued to be transferred to Target B until either the queue is empty or Server C determines that Server B is properly functioning again and able to send data to Target B.

Server B Functionality is Restored

Once Server B has been repaired or restored to functionality, Server B can perform its function of saving A backup data and transferring data received from Source B to Target B. Server B can send the data that is still remaining in Server C queues of B backup data that have not been already been transferred to Target B by Server C.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the systems and methods without departing from the scope of the invention, it is intended that all matter contained in the above description and shown in the accompanying drawings shall be interpreted as illustrative and not in a limiting sense.

What is claimed is:

1. A computer-implemented method for redundantly saving electronic data transported from a source computing device to a target computing device over a computer network, the method comprising:

receiving the data from the source computing device at a primary computing device at an intermediate location, wherein the primary computing device is independent of the source computing device and the target computing device;

saving the data on the primary computing device;

after saving the data, saving secondary backup data corresponding to the saved data on a secondary computing device, wherein the secondary computing device is independent of the source computing device, the target computing device and the primary computing device, said secondary computing device being remote from the intermediate location such that a failure of the primary computing device does not cause a failure of the secondary computing device;

determining if the secondary backup data is stored on the secondary computing device;

if the secondary backup data is stored on the secondary computing device:
  confirming to the source computing device that the data has been received; and
  in response to confirming the data has been received, transferring data from the primary computing device to the target computing device;

if the secondary backup data is not stored on the secondary computing device:
  identifying a failure of the secondary computing device; and
  refusing confirmation of receipt of the data from the source computing device;

in response to receiving a confirmation from the target computing device that the data has been received by the target computing device:
  deleting the saved data from the primary computing device; and
  deleting the secondary backup data from the secondary computing device.

2. The method of claim 1, further comprising:
identifying a failure of the primary computing device; and
transferring the secondary backup data to a target computing device when the primary computing device has failed.

3. The method of claim 1, further comprising:
wherein when the secondary backup data is not saved to the secondary computing device,
transferring previously confirmed data to the target computing device.

4. The method of claim 3, further comprising:
identifying operability of the secondary computing device subsequent to its failure;
confirming receipt of new data from the source computing device; and
saving new secondary backup corresponding to the new data to the secondary computing device.

5. The method of claim 1, wherein the data comprise electronic mail.

6. A system for providing recovery of electronic data transported from a source server to a target server over a computer network, said system comprising:

a primary server, said primary server being at an intermediate location, for receiving data from the source server and storing the received data in a primary server memory area, wherein the primary server is independent of the source server and the target server;

a secondary server remote from the primary server such that a failure of the primary server does not cause a failure of the secondary server, wherein the secondary server is independent of the source server, a target server and the primary server;

wherein said primary server is configured to execute computer-executable instructions for:
  receiving data from the source server;
  saving the received data to the primary server memory area;

after saving the received data to the primary server memory area, determining if the secondary server has failed:
    in response to determining the secondary server has not failed:
        sending secondary backup data corresponding to the received data to the secondary server;
    in response to determining the secondary server has failed:
        refusing confirmation of receipt of the data from the source server;
wherein said secondary server is configured to execute computer-executable instructions for:
    receiving secondary backup data from the primary server;
    saving the received secondary backup data to a secondary server memory area; and
    providing confirmation to the primary server when the secondary backup data has been saved.

7. The system of claim 6, wherein said primary server is further configured to execute computer-executable instructions for:
    confirming receipt of the data received from the source server; and
    sending the data to the target server.

8. The system of claim 6, wherein said remote secondary server is configured to execute computer-executable instructions for transferring secondary backup data to the target server upon failure of the primary server.

9. The system of claim 6, wherein said primary server is further configured to execute computer-executable instructions for transferring previously confirmed data from the primary server to the target server.

10. The system of claim 6, wherein the data comprise electronic mail.

11. One or more computer-readable storage media having stored thereon computer-executable components for providing high availability transport of electronic data, said components comprising a primary component and a secondary component, wherein:
    said primary component:
        receiving data from a source computing device and storing the received data in primary storage, wherein the primary storage is independent of the source computing device and a target computing device;
        determining whether there is a failure of the secondary component; and
        in response to determining there is a failure of the secondary component:
            refusing to confirm receipt of the data from the source computing device;
        in response to determining there is not a failure of the secondary component:
            confirming to the source computing device that the data has been received;
    said secondary component:
        saving secondary backup data corresponding to the data stored in primary storage to a remote computing device independent of the source computing device, the target computing device, and the primary storage, such that a failure of the primary storage does not cause a failure of the remote computing device;
        confirming the secondary backup data has been saved to the remote computing device;
        determining a failure of the remote computing device;
        in response to determining the failure of the remote computing device, acquiring an alternative remote backup computing device;
        saving secondary backup data to the alternative remote backup computing device; and
        receiving confirmation when the secondary backup data has been saved by the alternative remote backup computing device.

12. The computer-readable storage media of claim 11, further comprising a target component sending data to the target computing device from primary storage and receiving confirmation from the target computing device that the sent data has been received by the target computing device.

13. The computer-readable storage media of claim 11, wherein the primary component deletes stored data from primary storage and wherein the secondary component deletes the secondary backup data after the target computing device confirms that data has been received by the target computing device.

14. The computer-readable storage media of claim 11, wherein the data comprise electronic mail.

15. A primary server for use with a system for transporting electronic data from a source server to a target server over a computer network via a primary server, said primary server configured to execute computer-executable instructions comprising:
    receiving data from the source server;
    saving the received data to a primary server memory area;
    after saving the received data to the primary server memory area, sending secondary backup data corresponding to the received data from the source server to a secondary server, the secondary server and the primary server being independent of each other;
    after sending, determining whether the secondary server has failed;
    in response to determining the secondary server has not failed:
        confirming receipt of the data received from the source server;
        sending the data to the target server;
        receiving confirmation from the target server that the data has been received;
        sending instructions to the secondary server to delete the secondary backup data from the secondary server;
        deleting the saved data from the primary server;
    in response to determining the secondary server has failed:
        refusing to confirm receipt of the data from the source server;
        sending the data to the target server;
        in response to receiving a confirmation from the target server that the data has been received by the target server, deleting the saved data from the primary server and confirming receipt of the data from the source server.

16. The system of claim 15, wherein the data comprise electronic mail.

* * * * *